(12) United States Patent
Aelten

(10) Patent No.: US 6,275,802 B1
(45) Date of Patent: Aug. 14, 2001

(54) SEARCH ALGORITHM FOR LARGE VOCABULARY SPEECH RECOGNITION

(75) Inventor: Filip Van Aelten, Herelbeke (BE)

(73) Assignee: Lernout & Hauspie Speech Products N.V., Ypres (BE)

( * ) Notice: Subject to any disclaimer, the term of this patent is extended or adjusted under 35 U.S.C. 154(b) by 0 days.

(21) Appl. No.: 09/226,863

(22) Filed: Jan. 7, 1999

(51) Int. Cl.[7] .................................................. G01L 15/14
(52) U.S. Cl. ........................................ 704/255; 704/242
(58) Field of Search ................................... 704/242, 255

(56) References Cited

U.S. PATENT DOCUMENTS

| | | | |
|---|---|---|---|
| 5,241,619 | 8/1993 | Schwartz et al. | 395/2 |
| 5,349,645 | 9/1994 | Zhao | 704/243 |
| 5,621,859 | 4/1997 | Schwartz et al. | 704/256 |
| 5,737,722 | * 4/1998 | Kopp et al. | 704/241 |
| 5,749,069 | * 5/1998 | Komori et al. | 704/240 |
| 5,805,772 | * 9/1998 | Chou et al. | 704/255 |
| 5,956,678 | * 9/1999 | Haeb-Umbach et al. | 704/256 |
| 6,226,610 | * 10/2000 | Keller et al. | 704/241 |

FOREIGN PATENT DOCUMENTS 9 248 377 A   12/1987   (EP) .

OTHER PUBLICATIONS

Austin, Steve, et al, "The Forward–Backward Search Algorithm", *IEEE*, Ch. 2977–7/91/0000–0697.

Ney, H. et al, "Improvements in Beam Search For 10000–Word Continuous Speech Reconigition", *IEEE*, 0–7803–0532–9/92.

Oerder, Martin, et al, "Word Graphs: An Efficient Interface Between Continuous–Speech Recognition and Language Understanding", *IEEE*, 0–7803–0946–4/93.

Schwartz, Richard, et al, "The N–Best Algorithm: An Efficient and Exact Procedure for Finding the N Most Likely Sentence Hypothesis", *IEEE*, Ch2847–2/90/0000–0081.

Schwartz, Richard, et al, "A Comparison of Several Approximate Algorithms For Finding Multiple (N–BEST) Sentence Hypothesis", *IEEE*, Ch2977–7/91/0000–0701.

Hanazawa, Ken, et al, "An Efficient Search Method for Large–Vocabulary Continuous–Speech Recognition", *Proceedings IEEE Inernational Conference on Acoustics, Speech and Signal Processing (ICASSP '97)*, vol. 3, 1997, pp. 1787–1790.

Van hamme, Hugo, et al, "An Adaptive–Beam Pruning Technique for Continuous Speech Recognition", *Proceedings International Conference on Spoken Language Processing (ICSLP '96)*, vol. 4, Oct. 3–9, 1996, pp. 2083–2086.

* cited by examiner

*Primary Examiner*—Tālivaldis Ivars Šmits
(74) *Attorney, Agent, or Firm*—Bromberg & Sunstein LLP

(57) ABSTRACT

Automatic speech recognition word sequence hypotheses are generated using an interleaved forward-backward search. A forward search pass uses relatively simple models for a given block period of time. A backward search pass then goes back over the previous block period using more complex models and the recognition hypotheses generated by the forward search pass. The backward search pass employs a word dependent n-best search having a flat model state organization.

34 Claims, 4 Drawing Sheets

SEARCH ALGORITHM FOR LARGE VOCABULARY SPEECH RECOGNITION

TECHNICAL FIELD

The present invention generally relates to speech recognition systems, and more particularly, to search algorithms for recognizing sequences of words in an input utterance.

BACKGROUND ART

A speech recognition system compares input speech parameters to word models in the form of state sequences. That is, each word in the system vocabulary is modeled as a sequence of connected states in which the states, the connections, or both are characterized by probability distributions of the speech parameters. During the recognition search, multiple recognition hypotheses are maintained, each hypothesis being predicated on: 1) the arrival of the input speech in a given state of a given word model, and 2) that a given sequence of words was spoken before that word. For the speech recognition system to operate at an acceptable speed, the number of active recognition hypotheses needs to be limited.

Forward-backward search is a commonly known technique for efficient speech recognition. A discussion of this subject matter appears in Chapter 12 of Deller, Proakis & Hansen, *Discrete-Time Processing of Speech Signals* (Prentice Hall, 1987), which is incorporated herein by reference. Forward-backward search employs a two-level approach to search a vast space of possible word sequences in order to assess which word sequence is most likely to have been spoken. In the forward search pass, relatively simple models are used to create a first set of word recognition hypotheses of words which could have been spoken, along with their associated occurrence probabilities. The backward search pass in the reverse direction uses more complex models which require greater computational resources. The number of possible word sequences considered by the backward search pass is limited by starting from the set of recognition hypotheses produced by the forward search pass. A forward-backward search algorithm, as described in the prior art, performs a forward search on an input utterance until the utterance ends, and then searches backwards from the end to the beginning of the utterance. This leads to a system in which the recognized words are presented only after the end of the complete utterance.

One approach utilizing a forward-backward search, described by Schwartz et al. in U.S. Pat. No. 5,241,619, which is hereby incorporated herein by reference, uses a forward search employing a relatively simple algorithm, followed by a backward search which performs a more complex word dependent n-best search. For a given state in a given word, Schwartz requires that different recognition hypotheses be maintained for different possible word histories. These recognition hypotheses form a monolithic set, which is limited to a certain maximum number. When the best recognition hypothesis in the set has a probability score which is outside a given offset from the probability score of the overall best recognition hypothesis of that speech frame, all of the recognition hypotheses in the set are removed in a single operation.

Thus, Schwartz describes a system with a two level state organization, with super-states that contain substates for different previous words. There are different mechanisms for limiting the number of super-states and the number of substates per super-state. The complexity of the state structure in Schwartz requires considerable computational time and resources.

SUMMARY OF THE INVENTION

A preferred embodiment of the present invention is directed to a speech recognition system and a method for processing an input speech signal represented by a sequence of parameters. A current block time period in the sequence has a duration sufficient that at least one word in the input speech signal is likely included. The current block time period is searched at selected locations in the sequence with a forward search pass that uses a first set of word models having sequences of model states. For each state in a set of selected model states, a most likely forward pass recognition hypothesis is generated which ends in the state and corresponds to the input speech signal. A backward search pass, back through the sequence of parameters within the current block time period is then performed using a second set of word models having sequences of model states and the set of recognition hypotheses generated by the forward search pass. A current word graph is produced which is composed of a set of word graph recognition hypotheses of at least one word, that end in selected model states, and nodes which connect adjacent words in the word graph. Word graph recognition hypotheses having an occurrence probability score less than a selected threshold are pruned. Any preceding word graph is updated by linking recognition hypotheses of the preceding word graph to the current word graph. The method is repeated for the next block time period until the sequence of parameters ends.

In a further embodiment, the forward search pass over the current block time period begins operation with the forward pass recognition hypotheses that were active at the end of the immediately preceding forward search pass, if any. In addition, or alternatively, the backward search pass may continue into a portion of the sequence of parameters in an immediately preceding block time period, if any. In such an embodiment, the step of updating may also include continuing the backward search pass in a reduced search mode over a portion of the immediately preceding block time period. Such a reduced search mode includes creating, when the backward search pass at a given time reaches a beginning of a word, a new node in the current word graph for that word, and examining the previous word graph for a node for that word at that time. If such a node exists, a substitute pointer is created from that node in the previous word graph to the new node in the current word graph, and the backward search pass for that word is stopped. If no such node exists, the backward search pass is continued.

In addition, or alternatively, the step of updating may further include deleting inactive recognition hypotheses of the preceding word graph. In a preferred embodiment, the step of updating may use pointers in the word graph to trace back from recognition hypotheses in the preceding word graph, and then reconnecting the backward pointers of active hypotheses of the preceding word graph to corresponding recognition hypotheses in the current word graph.

In an alternative embodiment, each word graph contains layers of recognition hypotheses and the step of updating involves processing backward through the word graph layers. The word graph layers may be structured so that recognition hypotheses within a word graph layer point to preceding word graph layers so that all the hypotheses within each word graph layer are updated when the word graph layer is processed. All recognition hypotheses ending at the same time may be within the same word graph layer. In addition, time may be an indexed part of each word graph layer. In such an embodiment, the layers may be updated by redirecting links from recognition hypotheses in the preceding word graph to recognition hypotheses in the current word graph.

In a preferred embodiment, the step of updating may also include outputting at least one of the probable recognition hypotheses of the current word graph such as by displaying to a user at least one of the recognition hypotheses, for example, the most probable recognition hypothesis.

In addition, or alternatively, a preferred embodiment may include pruning the current word graph when the sequence of parameters continues for a predetermined length of time without pausing at the end of a phrase. Such pruning may include determining the most probable recognition hypothesis for the current word graph, selecting a boundary time between a pair of words near the end of the most probable recognition hypothesis, and treating the boundary time as the end of the sequence of parameters and the beginning of a new sequence of parameters.

In accordance with another preferred embodiment of the present invention, there is provided a method for processing a sequence of parameters that represent an input speech signal to compute accurate occurrence probabilities of multiple recognition hypotheses. At selected locations in the sequence, the parameters are compared to selected word models which contain sequences of model states. Then, for selected model states in each selected word model, a plurality of recognition hypotheses are generated which end in that model state, each recognition hypothesis having an associated probability score corresponding to the likelihood of the recognition hypothesis corresponding to the input speech signal. Recognition hypotheses having an occurrence probability score less than a selected score threshold are pruned. Such a method may be used in combination with any of the above methods of forward and backward searches.

BRIEF DESCRIPTION OF THE DRAWINGS

The foregoing features of the invention will be appreciated more fully from the following further description thereof with reference to the accompanying drawings wherein.

DETAILED DESCRIPTION OF SPECIFIC EMBODIMENTS

Figure 1:
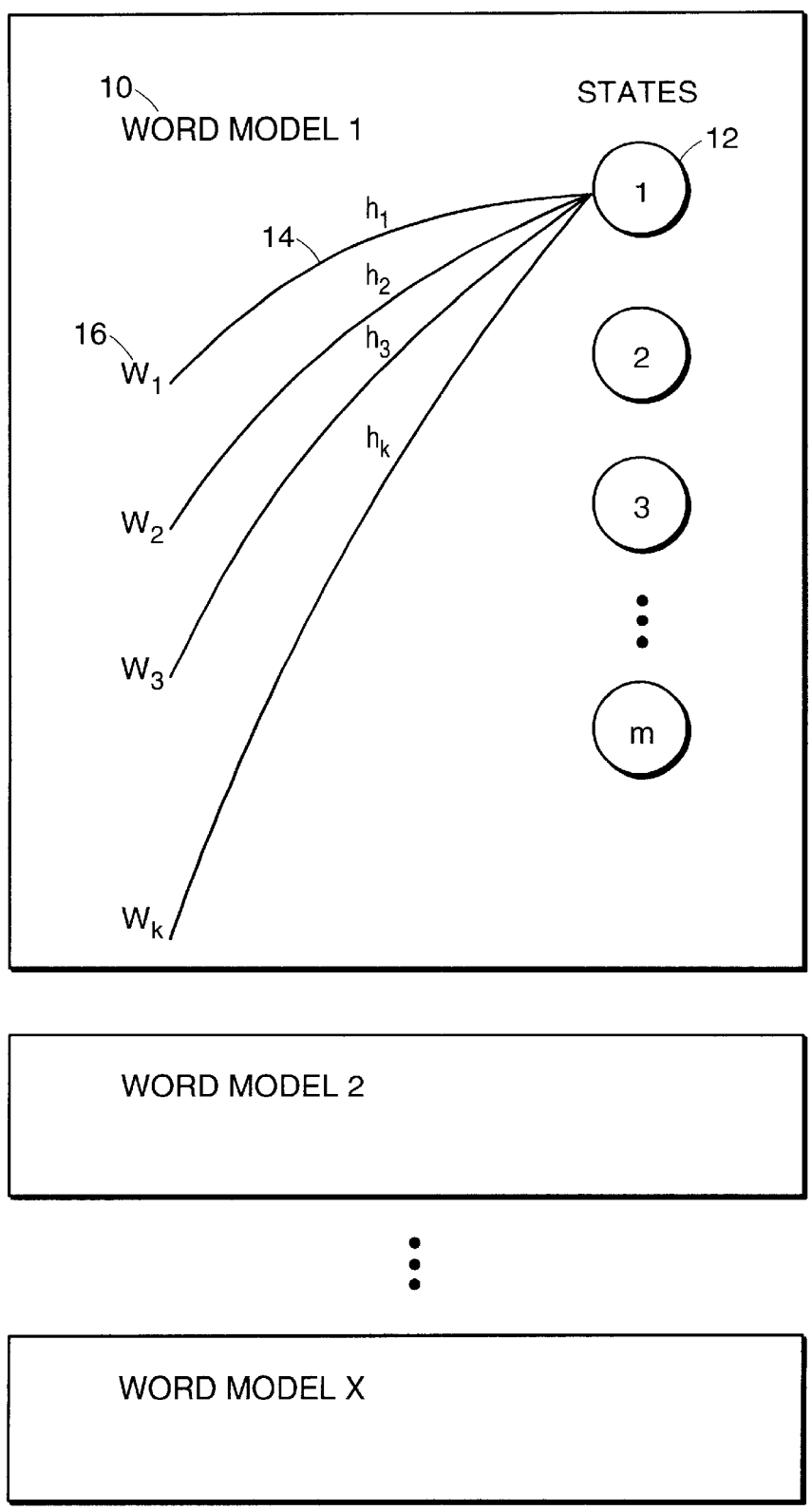
FIG. 1 illustrates the structure of word models in an n-best search.

A preferred embodiment of the present invention includes a forward-backward search of a sequence of parameters representative of an input speech signal. The backward pass of the search uses a word dependent n-best search, an example of which is illustrated in part in FIG. 1. Each word model 10 considered by the word dependent n-best search has m model states 12 of interest. The exact number of models states m is, in general, different for different words. For each such model state 12, multiple recognition hypotheses 14 are maintained. Each recognition hypothesis 14 represents arriving in a given state 12 of a given word model 10 from a different predecessor word 16.

In order for the search to occur at an acceptable speed, there must be some provision for removing poorly scoring (i.e., less probable) recognition hypotheses 14 from the search. In the n-best search of Schwartz when the best recognition hypothesis 14 associated with a given state 12 in a given word model 10 has a probability score which is outside a given offset from the probability score of the overall best recognition hypothesis 14 of that speech frame, all of the recognition hypotheses 14 associated with that state 12 in that word model 10 are removed in a single operation.

In contrast, a preferred embodiment of the present invention employs a flat organization of model states 12, and a single mechanism for limiting the number of model states 12 maintained during the search. All recognition hypotheses 14 are considered separately and each recognition hypothesis 14 is removed from the search when its probability score falls outside an offset from the probability score of the overall best recognition hypothesis 14 of that frame. This flat organization of model states 12 results in a less complex algorithm that requires fewer computational resources for a given recognition accuracy than prior n-best search algorithms which employ a two level model state organization.

Another advantage of a preferred embodiment of the present invention is that forward and backward search passes are interleaved so that the recognition hypotheses developed by the forward search pass are only kept for a fixed, limited period of time, and words are recognized a fixed delay after they have been spoken. A preferred embodiment may be used in a system which handles fully continuous speech in which no pauses occur, or wherein stretches of speech between two pauses can be arbitrarily long. For this purpose, an embodiment may have a special word graph pruning procedure for when a period of speech extends a predetermined length of time without pausing.

Figure 2:
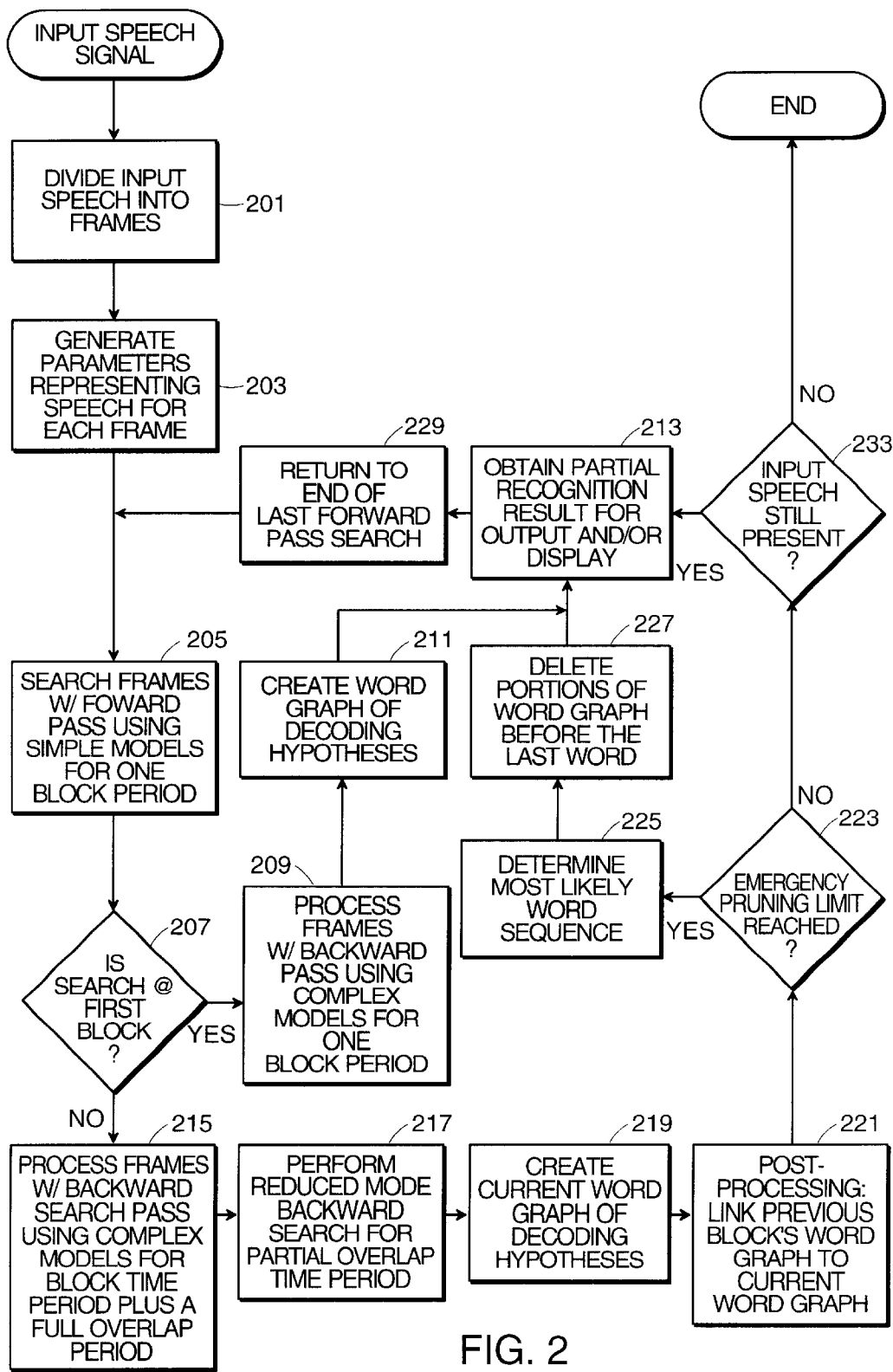
FIG. 2 is a flow chart illustrating a method of a preferred embodiment of the invention.
Figure 4:
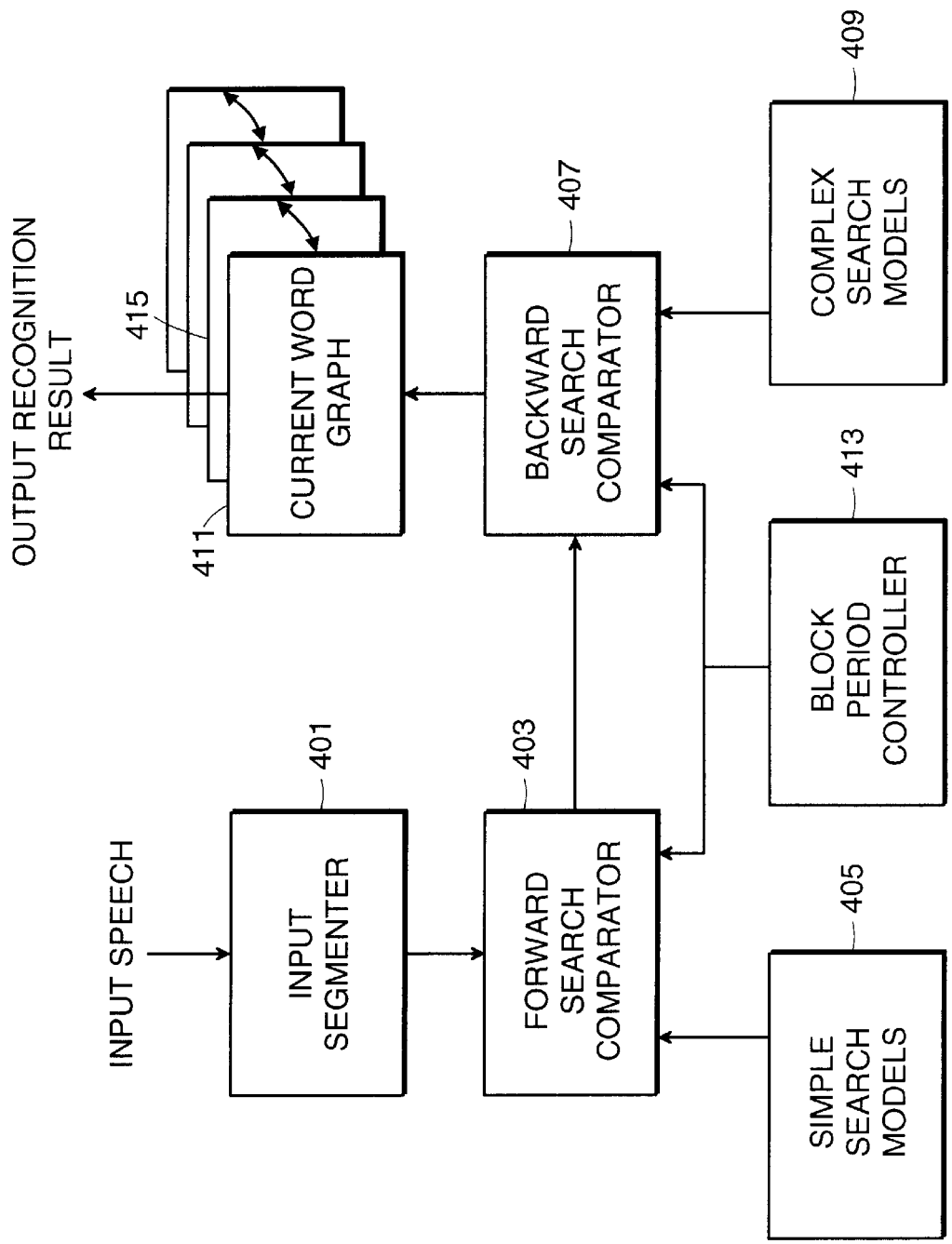
FIG. 4 illustrates a speech recognition system according to a preferred embodiment of the present invention.

A preferred embodiment of a speech recognition system according to the present invention is illustrated in FIG. 4, and the steps of a corresponding method of a speech recognition system are shown in FIG. 2. An input segmenter 401 according to step 201 divides an input speech signal into a sequence of fixed time interval frames. The input segmenter 401 in step 203 then generates speech parameters which represent the speech present during each frame. Such dividing of input speech into frames and generating speech parameters is a process for initial processing of input speech signals which is well known within the art See, for example, Chapter 7 of Deller, Proakis & Hansen, *Discrete-Time Processing of Speech Signals* (Prentice Hall, 1987), which is incorporated herein by reference.

Figure 3:
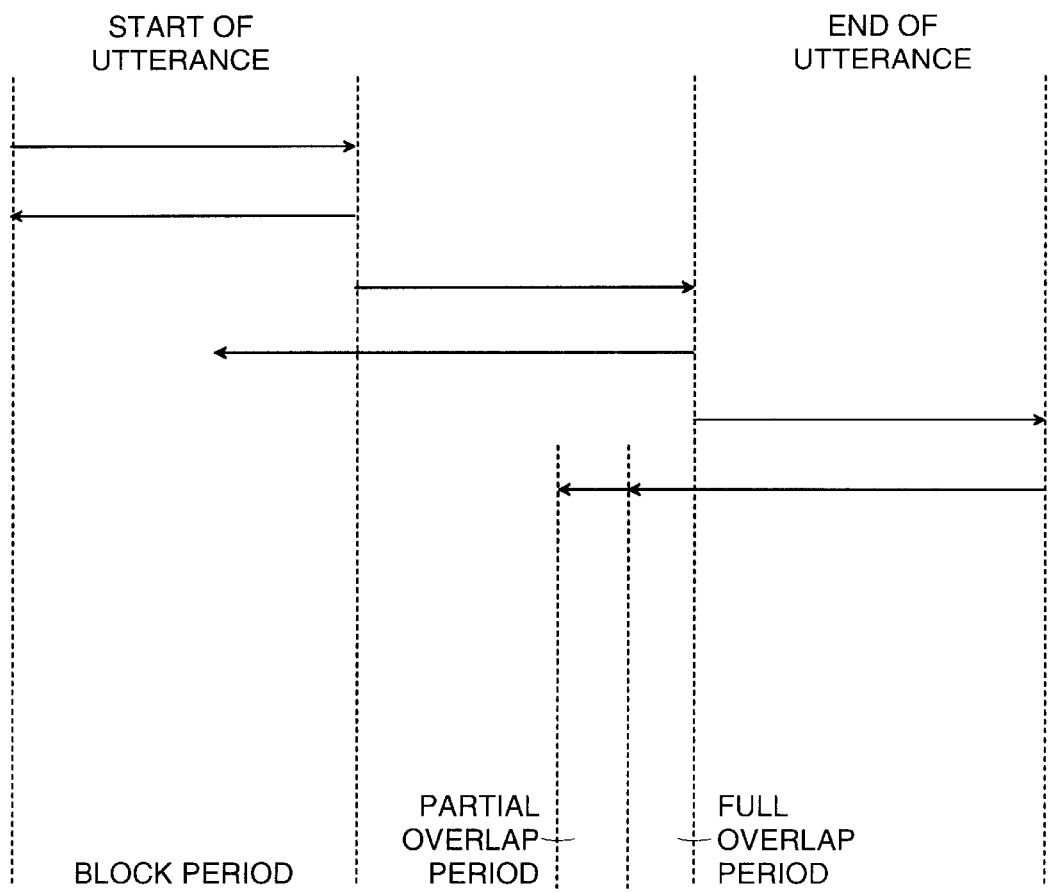
FIG. 3 illustrates the sequencing of forward and backward search passes in the embodiment of FIG. 2.

Next, a specific sequencing of forward and backward search passes occurs, as further illustrated in FIG. 3. The search sequencing is based on three fixed time period intervals: a block time period, a full overlap period, and a partial overlap period. First, a forward search comparator 403 in step 205 performs a forward search pass over a first block time period comparing the sequence of speech parameters present to relatively simple models 405 and generating sets of likely word endings at specified times (i.e., a set of words that likely ended at each such specified time such as each frame, each second frame, or each third frame). Thus, the forward search pass 205 over a block time period operates much as in prior art search algorithms-moving from state to state through a word model and at the end of the word, moving to all legal successor words. In large vocabulary speech recognition systems, all words of the vocabulary (typically, several tens of thousands) are legal followers However, at the end of the block time period there is a determination in step 207 whether the forward search pass is at the first block period in the input speech. If so, a block period controller 413 instructs a backward search comparator 407 in step 209 to perform a backward search pass back over the same block of speech parameters, restricting the backward search to words that came out as likely candidates in the forward search pass, and comparing these recognition hypotheses to more complex models 409. Accordingly, when the backward search pass, in step 209, moves back through the current block of speech parameters and reaches the beginning of a word at some time t, it references the list of words from the forward search pass, in step 205, that ended with an acceptable probability at time t and enters only those words.

As the backward search pass of step 209 proceeds, in step 211 a word graph 411 is created which is a commonly known compact representation of decoding word recognition hypotheses together with their associated occurrence probabilities. The word graph 411 also represents a partial recognition result which in step 213 may be displayed to the user or provided as an output to another part of the system for further processing. In step 229, the block period controller 413 then instructs the forward search comparator 403 to return to the word recognition hypotheses that were active at the end of the last forward search pass and perform in step 205 a forward search pass for the next block time period.

If it is determined in step 207 that the block time period which is ending is not the first block time period in the input speech, then the block period controller 413 instructs the backward search comparator 407 to accomplish a backward search pass in accordance with step 215 using the complex models 409 to process for a block time period, and continuing the backward search into the previous block time period for a full overlap period. The backward search pass, during the full overlap period, continues back over a portion of the previous block time period during which the set of active recognition hypotheses was not yet fully reliable. In step 217, the backward search pass then continues in a reduced mode search during a partial overlap period.

Concurrently with the backward search of steps 215 and 217, in step 219 a current word graph 411 is created which represents the recognition hypotheses produced and active to the current position in the backward search pass. In reduced search mode during the partial overlap period of step 217, the backward search pass upon reaching the end of a word attempts to lock onto the previous word graph 415 produced in the previous backward search pass, and, if successful, processing stops for that word. Locking means that a substitute pointer is created from an element of the previous word graph 415 to one in the current word graph 411. In other words in step 217, when the reduced mode backward search reaches the beginning of a word at time t, a new node is created in the current word graph 411 for that word as in the full backward search of step 215. The reduced mode backward search in step 217 then checks the previous word graph 415 for a node for that word at that time. If such a node exists, a substitute pointer is created from that node in the previous word graph 415 to the new node in the current word graph 411, and no successor words are entered as the backward search stops for that word. Otherwise, the backward search continues as before. During the reduced search mode in step 217, the search space gradually vanishes.

It will be appreciated that the relative lengths of the block time period, full overlap period, and partial overlap period may be given different values by the block period controller 413 to achieve different compromises between recognition accuracy, speed of producing partial recognition results, and surplus computational load. In any event, the sum of the partial overlap period and the full overlap needs to be smaller than the block time period. The block period controller 413 in a preferred embodiment uses a block time period of 3 seconds, a full overlap period of 1 second, and a partial overlap period of 1.5 seconds. Lower values of the partial and full overlap periods lead to reduced recognition accuracy. Higher values of the full block period lead to reduced surplus computational load since a smaller fraction of the speech is processed twice in the backward pass, but make the system slower in producing partial recognition results.

Postprocessing of the word graph 221 occurs after each new block of speech, except for the first, has been processed by both the forward and the backward search passes. During postprocessing 221, the word graph 415 produced during the previous backward search is updated so as to become a seamless extension of the current word graph 411 as would have been created by a full backward search back to the beginning of the utterance. Both the full and reduced mode backward searches operate on a state by state basis and require both the speech parameters of block 203 and the likely word endings coming out of the forward search pass 205. The postprocessing 221 also goes from the end of the utterance back in time towards the beginning, but does not need speech parameters or likely word endings. Thus, less memory is required and the postprocessing 221 proceeds faster than a search algorithm because it operates on a word by word basis as opposed to state by state.

The partial overlap portion of the current backward search pass produced "substitute" pointers from elements of the previous word graph 415 to elements in the current word graph 411 that need to be substituted for the elements in the previous word graph 415. Updating involves linking active elements of the previous word graph 415 with elements of the current word graph 411 through the substitute pointer. It may further involve deleting, or "pruning", inactive elements of the previous word graph 415 which are not connected with the current word graph 411.

In one embodiment, word graphs may contain backward pointers which connect a word to a previously spoken word so that proper pointer substitutions may be made by tracing back from substituted elements, and redirecting connections to the substituting elements. Thus, the previous word graph 415 may be traversed back to mark elements of the previous word graph 415 from which the current word graph 411 may be reached. The remainder of the previous word graph 415 may be deleted.

In an alternative embodiment, the word graphs may contain no backward pointers, but may have a layered organization, such that moving down through the layers of the word graph corresponds to moving backwards in time. Each layer may contain elements that point to previous layers and be structured so that all elements contained in that layer can be reached. Thus, a layer may contain all the nodes or arcs in the word graph which correspond to words ending at a given time, which time may be an indexed part of the layer. The word graph may then be updated by traversing back layer by layer, from the end of the previous word graph 415 to the beginning of the utterance. Within each layer, each element of the layer is processed such that links to elements to be substituted in the previous word graph 415 may be redirected to the substituting elements in the current word graph 411. Elements in the previous word graph 415 may be deleted if they are not linked with marked or substituting elements in the current word graph 411.

In an embodiment, each time a block of speech has been processed by the forward and backward search passes, and the word graph 411 has been updated, a partial recognition result 213 may also be produced for display to the user or output to another part of the system. The system memory required for information to be passed from the forward search pass to the backward search pass, may be limited to the forward block time period plus the full overlap and partial overlap time periods.

The word graph 411 produced by the backward search passes, and updated by the postprocessing, continues to grow with the length of the utterance. When a sufficiently long pause occurs, the utterance may be considered finished, as shown at 233 of FIG. 2, and the word graph 411 may be output for further processing by other parts of the system. If the input speech is still present, a new forward search pass may resume 229, starting from the decoding hypotheses which were active when the previous forward search pass ended. If the input speech fails to pause after a given length of time, shown at 223 of FIG. 2, a special word graph pruning procedure may be invoked. A predetermined number of speech blocks may be processed as described above, without a sufficiently long pause occurring to signal the end of the utterance, at 223. Then, the most probable word sequence 225 may be determined from the current word graph. A boundary time, t, between a pair of words near the end of the last block (e.g., the 4th and 3rd last words) in that sequence then may be considered to be the end of the utterance. The word graph 411 may be pruned so that all word sequences end at the boundary time, t, 227. All elements of the word graph 411 which are not linked at time t may be deleted 227. As with the postprocessing updating described above, there may be alternative approaches to deleting elements of the word graph 411 not connected at time t. The next utterance may be considered to start at time t. The forward search pass may resume where it previously left off 229, and processing may proceed normally.

What is claimed is:

1. A method of a speech recognition system for processing a sequence of parameters that represent an input speech signal, the method comprising:
   a. at selected locations in the sequence, searching over a current block time period having a duration sufficient that at least one word in the input speech signal is likely included, with a forward search pass that:
      i. compares the current block time period parameters to selected word models from a first set of word models having sequences of model states, and
      ii. for each state in a set of selected model states, generates a most likely forward pass recognition hypothesis ending in the state and corresponding to the input speech signal;
   b. performing a backward search pass, back through the sequence of parameters within the current block time period, that:
      i. compares the current block time period parameters to selected word models from a second set of word models having sequences of model states, and to the most likely forward pass recognition hypotheses,
      ii. generates a current word graph including
         (1) a set of word graph recognition hypotheses, of at least one word, that end in selected model states, each recognition hypothesis having an associated occurrence probability score representing the likelihood of that recognition hypothesis corresponding to the input speech signal, and
         (2) nodes which connect adjacent words in the current word graph; and
      iii. prunes any generated word graph recognition hypothesis that has an occurrence probability score less than a selected threshold;
   c. updating any preceding word graph by linking recognition hypotheses of the preceding word graph to the current word graph; and
   d. repeating steps (a)–(c) for the next block time period until the end of the utterance.

2. A method as in claim 1, wherein the forward search pass over the current block time period, begins operation with forward pass recognition hypotheses that were active at the end of the immediately preceding forward search pass, if any.

3. A method as in claim 1, wherein the backward search pass continues into a portion of the sequence of parameters in an immediately preceding block time period, if any.

4. A method as in claim 3, wherein the step of updating includes continuing the backward search pass in a reduced search mode over a portion of the immediately preceding block time period, wherein the reduced search mode includes:
   when the backward search pass at a given time reaches a beginning of a word, creating a new node in the current word graph for that word; and
   examining the preceding word graph for a node for that word at that time and,
      if such a node exists,
         creating a substitute pointer from that node in the preceding word graph to the new node in the current word graph, and
         stopping the backward search pass for that word; and
      if no such node exists, continuing the backward search pass.

5. A method as in claim 1, wherein the step of updating uses backward pointers to connect recognition hypotheses in the current word graph with recognition hypotheses in the preceding word graph.

6. A method as in claim 5, wherein the step of updating includes:
   tracing back the backward pointers from recognition hypotheses in the preceding word graph, and
   reconnecting the backward pointers of active recognition hypotheses of the preceding word graph to corresponding recognition hypotheses in the current word graph.

7. A method as in claim 1, wherein each word graph contains layers of recognition hypotheses and the step of updating processes back through the word graph layers.

8. A method as in claim 7, wherein the word graph layers are structured so that recognition hypotheses within a word graph layer point to preceding word graph layers and so that all the recognition hypotheses within each word graph layer are updated when the word graph layer is processed.

9. A method as in claim 7, wherein all recognition hypotheses ending at the same time are within the same word graph layer.

10. A method as in claim 7, wherein time is an indexed part of each word graph layer.

11. A method as in claim 7, wherein the word graph layers are updated by redirecting links from recognition hypotheses in the preceding word graph to recognition hypotheses in the current word graph.

12. A method as in claim 1, wherein the step of updating includes deleting inactive recognition hypotheses of the preceding word graph.

13. A method as in claim 1, wherein the step of updating further includes outputting at least one of the probable recognition hypotheses of the current word graph.

14. A method as in claim 13, wherein the step of outputting includes displaying to a user at least one of the probable recognition hypotheses.

15. A method as in claim 13, wherein the step of outputting outputs the most probable recognition hypothesis of the current word graph.

16. A method as in claim 1, the method further including pruning the current word graph when the sequence of parameters continues for a predetermined length of time without pausing at the end of a phrase.

17. A method as in claim 16, wherein the step of pruning includes:

determining the most probable recognition hypothesis for the current word graph;

selecting a boundary time between a pair of words near the end of the most probable recognition hypothesis; and treating the boundary time as a end of the sequence of parameters and a beginning of a new sequence of parameters.

18. A speech recognition system comprising:

a. an input segmenter that processes an input speech signal into a sequence of representative parameters;

b. a forward search comparator in communication with the input segmenter that, at selected locations in the sequence, searches a current block time period having a duration sufficient that at least one word in the input speech signal is likely included, with a forward search pass that:
 i. compares the current block time period parameters to selected word models from a first set of word models having sequences of model states,
 ii. for each state in a set of selected model states, generates a most likely forward pass recognition hypothesis ending in the state and corresponding to the input speech signal;

c. a backward search comparator in communication with the forward search comparator that performs a backward search pass back though the sequence of parameters within the current block time period that:
 i. compares the current block time period parameters to selected word models from a second set of word models having sequences of model states, and to the forward pass recognition hypotheses,
 ii. generates a current word graph including
   (1) a set of word graph recognition hypotheses of at least one word that end in selected model states, each recognition hypothesis having an associated occurrence probability score representing the likelihood of that recognition hypothesis corresponding to the input speech signal, and
   (2) nodes which connect adjacent words in the current word graph, and
 iii. prunes any generated word graph recognition hypothesis that has an occurrence probability score less than a selected threshold;
 iv. updates any preceding word graph by linking recognition hypotheses of the preceding word graph to the current word graph; and d. a block period controller in communication with the forward search comparator and the backward search comparator that controls processing of the sequence of representative parameters in successive block periods.

19. A system as in claim 18, wherein the forward search comparator searches over the current block time period beginning operation with the forward pass recognition hypotheses from the immediately preceding forward search pass, if any.

20. A system as in claim 18, wherein the backward search comparator continues the backward search into a portion of the sequence of parameters in an immediately preceding block time period, if any.

21. A system as in claim 20, wherein the step of updating in the backward search comparator includes continuing the backward search pass in a reduced search mode over a portion of the immediately preceding block time period, wherein the reduced search mode includes:

when the backward search pass at a given time reaches a beginning of a word, creating a new node in the current word graph for that word; and examining the preceding word graph for a node for that word at that time and,
 if such a node exists,
  creating a substitute pointer from that node in the preceding word graph to the new node in the current word graph, and
  stopping the backward search pass for that word; and
 if no such node exists, continuing the backward search pass.

22. A system as in claim 18, wherein the step of updating in the backward search comparator uses backward pointers to connect recognition hypotheses in the current word graph with recognition hypotheses in the preceding word graph.

23. A system as in claim 22, wherein the step of updating in the backward search comparator includes:

tracing back the backward pointers from recognition hypotheses in the preceding word graph, and reconnecting the backward pointers of active recognition hypotheses of the preceding word graph to corresponding recognition hypotheses in the current word graph.

24. A system as in claim 18, wherein each word graph contains layers of recognition hypotheses and the step of updating in the backward search comparator processes back through the word graph layers.

25. A system as in claim 24, wherein the word graph layers are structured so that recognition hypotheses within a word graph layer point to preceding word graph layers and so that all the recognition hypotheses within each word graph layer are updated when the word graph layer is processed.

26. A system as in claim 24, wherein all recognition hypotheses ending at the same time are within the same word graph layer.

27. A system as in claim 24, wherein time is an indexed part of each word graph layer.

28. A system as in claim 24, wherein the word graph layers are updated by redirecting links from recognition hypotheses in the preceding word graph to recognition hypotheses in the current word graph.

29. A system as in claim 18, wherein the step of updating in the backward search comparator includes deleting inactive recognition hypotheses of the preceding word graph.

30. A system as in claim 18, wherein the step of updating in the backward search comparator further includes outputting at least one of the probable recognition hypotheses of the current word graph.

31. A system as in claim 30, wherein the step of outputting in the backward search comparator includes displaying to a user at least one of the probable recognition hypotheses.

32. A system as in claim 30, wherein the step of outputting in the backward search comparator outputs the most probable recognition hypothesis of the current word graph.

33. A system as in claim 18, wherein the backward search comparator further prunes the current word graph when the sequence of parameters continues for a predetermined length of time without pausing at the end of a phrase.

34. A system as in claim 33, wherein the step of pruning in the backward search comparator includes:

determining the most probable recognition hypothesis for the current word graph;

selecting a boundary time between a pair of words near the end of the most probable recognition hypothesis; and treating the boundary time as an end of the sequence of parameters and a beginning of a new sequence of parameters.

* * * * *